3,113,075
HETEROCYCLIC COMPOUNDS
John B. Bicking, Lansdale, and James M. Sprague, Gwynedd Valley, Pa., assignors to Merck & Co., Inc., Rahway, N.J., a corporation of New Jersey
No Drawing. Filed Oct. 17, 1960, Ser. No. 62,852
10 Claims. (Cl. 167—65)

This invention is concerned with novel 3,4-dihydro-2H-1,2-benzothiazine-1,1-dioxide compounds which contain a sulfamyl substituent attached to the benzenoid portion of the nucleus. The benzothiazine compounds of this invention can contain solely the sulfamyl group attached to the benzenoid portion of the nucleus or one or more additional substituents can replace one or more of the hydrogen atoms of the sulfamyl-benzothiazine compound. Preferred substituents that can be attached to the benzenoid portion of the nucleus are halogen, such as chlorine, bromine, fluorine and the like, or lower alkyl advantageously having from 1–5 carbon atoms. The nuclear nitrogen as well as the nitrogen of the sulfamyl group also can carry a radical other than hydrogen and if substituted they preferably carry a lower alkyl, benzyl or a substituted benzyl such as halobenzyl radical. The remaining hydrogen atoms of thiazine moiety can be replaced by one or more lower alkyl groups.

The novel benzothiazine compounds of this invention are useful pharmacotherapeutic agents particularly because of their diuretic, natriuretic and/or saluretic properties (hereinafter referred to as diuretic properties). The diuretic properties of the novel compounds of this invention make them particularly useful in the treatment of congestive heart failure or other abnormalities which produce an edematous condition in the body or which produce an imbalance in the electrolyte concentration in the body as, for example, those in which abnormal retention of sodium occur. The compounds can be administered in therapeutic dosages in conventional vehicles as in the form of tablets, pills, capsules and the like as they are effective upon oral administration.

The novel benzothiazine compounds of this invention can be prepared by amidating a 1-(2-haloethyl)benzene-2,4-disulfonyl chloride or other desired 1-(2-haloethyl)-benzene-disulfonyl chloride wherein at least one disulfonyl chloride is in ortho-position to the 2-haloethyl grouping. Amidation can be effected with ammonia or a primary amine to form the sulfamyl substituted 3,4-dihydro-2H-1,2-benzothiazine-1,1-dioxide.

The 1-(2-chloroethyl)benzene-disulfonyl chloride starting material can be prepared from a phenethyl halide which is treated with oleum to form the corresponding disulfonic acid which is separated in the form of its alkali metal salt, preferably the sodium or potassium salt. The product thus obtained is converted to the corresponding disulfonyl chloride advantageously by treatment with phosphorus pentachloride thus giving the desired 1-(2-haloethyl)benzene-disulfonyl chloride.

Compounds of particular importance are the products wherein the sulfamyl group is attached in the 7-position of the 3,4-dihydro-2H-1,2-benzothiazine-1,1-dioxides and wherein, if additionally substituted, said additional substituent is attached to the 6-position carbon of the benzothiazine nucleus.

While the above discussion outlines general methods suitable for the preparation of the novel compounds of this invention, it is to be understood that the described methods and the following examples, which more fully describe the preparation of the compounds of this invention, are illustrative of the methods which can be employed for the preparation of the novel compounds and are not to be construed as limiting the invention to the particular methods or the particular compounds specifically described.

EXAMPLE 1

*7-Sulfamyl-3,4-Dihydro-2H-1,2-Benzothiazine-1,1-Dioxide*

STEP A

Phenethyl chloride (56.2 g., 0.4 mole) is added dropwise with stirring to 110 g. of 20% oleum during 30 minutes. The solution is permited to stand one hour after which 110 g. of 65% oleum is added over a thirty minute period and the solution then is heated two hours on the steam bath. After cooling, the solution is poured on ice. Calcium hydroxide then is added until the mixture becomes slightly basic. The precipitated calcium sulfate is filtered off and a saturated solution of sodium carbonate is added to the filtrate until no more calcium carbonate precipitates. The precipitate is filtered off and the solution evaporated to dryness yeilding 102 g., of disodium 1-(2-chloroethyl)benzene-2,4-disulfonate. The product thus obtained is pulverized and then dried for about four hours at 135° C., in vacuo.

STEP B

The above obtained disodium salt and 126 g. (0.6 mole) of phosphorus pentachloride are mixed and heated 16 hours at 130° C. The mixture then is cooled and poured into ice water. The heavy oily product formed is taken up in ether and dried over sodium sulfate. Evaporation of the ether leaves the 1-(2-chloroethyl)benzene-2,4-disulfonyl chloride as a yellow oil. The disulfonyl chloride then is added to 300 cc., of ice cold concentrated ammonium hydroxide solution and the resulting solution allowed to stand 16 hours at room temperature. The solution then is acidified with hydrochloric acid to precipitate 7 - sulfamyl-3,4-dihydro-2H-1,2-benzothiazine-1,1-dioxide weighing 16.5 g., M.P. 203–213° C. Recrystallization of the product from aqueous isopropyl alcohol yields 11.2 g. of product, M.P. 215–218° C. A small sample is purified by recrystallization for analysis, M.P. 217–219° C.

*Analysis.*—Calculated for $C_8H_{10}N_2O_4S_2$: C, 36.63; H, 3.84; N, 10.68; S, 24.45. Found C, 37.05; H, 3.92; N, 10.64; S, 23.82.

EXAMPLE 2

*6-Chloro-7-Sulfamyl-3,4-Dihydro-2H-1,2-Benzothiazine-1,1-Dioxide*

STEP A m-Chlorophenylmagnesium bromide is prepared in 400 cc. of ether from 108 g. (0.565 mole) of m-chlorobromobenzene and 13.8 g. (0.565 mole) of magnesium. A solution of 52.8 g. (1.2 moles) of ethylene oxide in 200 cc., of ether is added during two hours. A viscous substance gradually separates which finally makes stirring impossible. After being allowed to stand overnight, the mixture is poured into ice-water and acidified with sulfuric acid. The ether layer is separated, dried and distilled to yield 52.2 g. (59.5%) of m-chlorophenethyl alcohol, B.P. 135–137°/13 mm., $n_D^{21}$ 1.5508.

STEP B

A solution of 15.7 g. (0.1 mole) of m-chlorophenethyl alcohol in 9.5 g. (0.12 mole) of pyridine is stirred with ice bath cooling while 12.5 g. (0.015 mole) of thionyl chloride is added dropwise during 20 minutes. The mixture is allowed to warm to room temperature then is heated 15 minutes on the steam bath. The mixture is poured into ice water and the oily product taken up in ether, dried and distilled to obtain 12.0 g., of m-chlorophenethyl chloride, B.P. 111–113°/13 mm., $n_D^{22}$ 1.5474.

STEP C m-Chlorophenethyl chloride (52.5 g., 0.3 mole) is sulfonated with 90 g., of 20% oleum and 90 g. of 65% oleum using substantially the same procedure described in Example 1, Step A. The product formed then is isolated in the form of the disodium salt by the method also described in Example 1, Step A, to give 106 g., of disodium 1-(2-chloroethyl)-5-chlorobenzene-2,4-disulfonate.

STEP D

A mixture of the above disodium salt and 125 g. (0.6 mole) of phosphorus pentachloride is heated 18 hours at 130° C. The mixture then is cooled and poured into ice water. The solid 1-(2-chloroethyl)-5-chlorobenzene-2,4-disulfonyl chloride which separates is removed and recrystallized twice from ether to yield 28.2 g., of purified disulfonyl chloride, M.P. 95–100° C. Four grams of the purified material is dissolved in 25 cc. of liquid ammonia. The sticky residue remaining when the ammonia has been removed by evaporation is dissolved in 20 cc., of 5% sodium hydroxide solution. The crystalline 6-chloro-7-sulfamyl-3,4-dihydro-2H-1,2 - benzothiazine-1,1-dioxide begins to separate in two hours. After three hours the product is collected and recrystallized from aqueous isopropyl alcohol to give 0.6 g. of analytically pure product M.P. 235.0–235.5° C.

Analysis.—Calculated for $C_8H_9ClN_2O_4S_2$: C, 32.38; H, 3.06; N, 9.44. Found: C, 32.63; H, 3.12; N, 9.38.

EXAMPLE 3

6-Bromo-2-Methyl-7-(N-Methylsulfamyl)-3,4-Dihydro-2H-1,2-Benzothiazine-1,1-Dioxide

STEP A

By following the procedure described in Example 2, Steps A through C, and replacing the m-chlorophenylmagnesium bromide employed in Step A by an equivalent quantity of m-bromophenylmagnesium bromide there is obtained disodium 1-(2-chloroethyl)-5-bromobenzene-2,4-disulfonate.

STEP B

By substituting the above described disodium salt for the disodium 1-(2-chloroethyl)-5-chlorobenzene-2,4-disulfonate employed in Step D of Example 2, and replacing the liquid ammonia by an excess of five molecular equivalents of methylamine (used in the form of a 25% aqueous solution of methylamine), and following substantially the same procedure described in Example 2, Step D, there is obtained 6-bromo-2-methyl-7-(N-methylsulfamyl)-3,4-dihydro-2H-1,2-benzothiazine-1,1-dioxide.

EXAMPLE 4

6-Methyl-7-Sulfamyl-3,4-Dihydro-2H-1,2-Benzothiazine-1,1-Dioxide

By replacing the m-chlorophenethyl chloride as employed in Example 2, Step C, by an equivalent quantity of m-methylphenethyl chloride and following substantially the same procedure described in Example 2, Steps C and D, there is obtained 6-methyl-7-sulfamyl-3,4-dihydro-2H-1,2-benzothiazine-1,1-dioxide.

EXAMPLE 5

6-Chloro-2-Ethyl-7-(N-Ethylsulfamyl)-3,4-Dihydro-2H-1,2-Benzothiazine-1,1-Dioxide By following the same procedure described in Example 2, Steps A to D, but replacing in Step D the liquid ammonia by an excess of five molecular equivalents of ethylamine (used in the form of a 25% aqueous solution thereof), there is obtained 6-chloro-2-ethyl-7-(N-ethylsulfamyl)-3,4-dihydro-2H-1,2-benzothiazine-1,1-dioxide.

EXAMPLE 6

6-Chloro-2-Benzyl-7-(N-Benzylsulfamyl)-3,4-Dihydro 2H-1,2-Benzothiazine-1,1-Dioxide By following substantially the same procedure described in Example 2, Steps A to D but replacing the liquid ammonia by an excess of five molecular equivalents of benzylamine (used in the form of a 25% aqueous solution thereof) there is obtained 6-chloro-2-benzyl-7-(N - benzylsulfamyl)-3,4-dihydro-2H-1,2-benzothiazine-1,1-dioxide.

EXAMPLE 7

6-Chloro-2-p-Chlorobenzyl-7-(N-p-Chlorobenzylsulfamyl)-3,4-Dihydro-2H-1,2-Benzothiazine-1,1-Dioxide By following substantially the same procedure described in Example 2, Steps A through D, but replacing the liquid ammonia employed in Step D by an excess of five molecular equivalents of p-chlorobenzylamine (used in the form of a 25% aqueous solution thereof), there is obtained 6-chloro-2-p-chlorobenzyl-7-(N-p-chlorobenzylsulfamyl)-3,4 - dyhdro-2H - 1,2 - benzothiazine-1,1-dioxide.

EXAMPLE 8

6-Fluoro-7-Sulfamyl-3,4-Dihydro-2H-1,2-Benzothiazine-1,1-Dioxide

By following substantially the same procedure described in Example 2, Steps A through D, but replacing the m-chlorophenylmagnesium bromide employed in Step A by an equivalent quantity of m-fluorophenylmagnesium bromide, there is obtained 6-fluoro-7-sulfamyl-3,4-dihydro-2H-1,2-benzothiazine-1,1-dioxide.

The compounds of this invention are effective diuretic and/or saluretic agents. Because of this property they are useful in therapy for the treatment of any condition resulting from an excessively high concentration of sodium in the body such as in the treatment of edematous conditions resulting, for example, from congestive heart failure.

The dosage of the novel compounds of this invention will vary over a wide range and for this reason tablets, pills, capsules and the like containing 100, 150, 250 and 500 mgms. of active ingredient can be made available to the physician for the symptomatic adjustment of the dosage to the individual patient. These dosages are well below the toxic or lethal dose of the compounds covered by this invention.

As each of the compounds of this invention can be incorporated in a dosage form similar to that described in the following example or in other dosage forms suitable for oral or parenteral administration for use in therapy which can be prepared by well known methods, only one example is included herein to illustrate the preparation of a representative dosage form.

EXAMPLE 9

Dry-Filled Capsules Containing 150 Mg. of Active Ingredient Per Capsule

Per capsule, mg.
6-chloro-7-sulfamyl - 3,4 - dihydro-2H-1,2-benzothiazine-1,1-dioxide _____ 150
Lactose _____ 125
Capsule size No. 2.

The 6-chloro-7-sulfamyl-3,4-dihydro-2H-1,2-benzothiazine-1,1-dioxide is reduced to a No. 60 powder. Lactose then is passed through a No. 60 bolting cloth onto the powder, the combined ingredients are admixed for 10 minutes and then filled into No. 2 dry gelatin capsules.

While the above examples describe the preparation of certain compounds which are illustrative of the novel compounds of this invention, and a certain specific dosage form suitable for administering the novel compounds, it is to be understood that the invention is not to be limited by the examples or by the specific reaction conditions described for the preparation of the compounds or by the specific ingredients included in the pharmaceutical preparation, but is to be understood to embrace variations and modifications thereof which fall within the scope of the appended claims.

What is claimed is:

1. 2 - $R^1$-6-R-7-sulfamyl-3,4-dihydro-2H-1,2-benzothiazine-1,1-dioxide wherein $R^1$ is selected from the group consisting of hydrogen, lower alkyl, benzyl, and halobenzyl and R is selected from the group consisting of hydrogen, halogen and lower alkyl.

2. 6 - halogen - 7 - sulfamyl-3,4-dihydro-2H-1,2-benzothiazine-1,1-dioxide.

3. 6 - chloro-7-sulfamyl-3,4-dihydro-2H-1,2-benzothiazine-1,1-dioxide.

4. 7-sulfamyl - 3,4 - dihydro-2H-1,2-benzothiazine-1,1-dioxide.

5. 6-lower alkyl-7-sulfamyl-3,4-dihydro-2H-1,2-benzothiazine-1,1-dioxide.

6. 6-halogen-2-lower alkyl-7-(N-lower alkylsulfamyl)-3,4-dihydro-2H-1,2-benzothiazine-1,1-dioxide.

7. 6 - halogen-2-benzyl-7-(N-benzylsulfamyl)-3,4-dihydro-2H-1,2-benzothiazine-1,1-dioxide.

8. 6-halogen-2-p-chlorobenzyl - 7 - (N-p-chlorobenzylsulfamyl)-3,4-dihydro-2H-1,2-benzothiazine-1,1-dioxide.

9. A process for the treatment of conditions associated with excess fluid retention and excess electrolyte retention which comprises administering 2-$R^1$-6-R-7-sulfamyl-3,4-dihydro-2H-1,2-benzothiadiazine-1,1-dioxide wherein $R^1$ is selected from the group consisting of hydrogen, lower alkyl, benzyl and halobenzyl and R is selected from the group consisting of hydrogen, halogen and lower alkyl, said compound being administered in sufficient quantity to enhance the excretion of said fluid and electrolytes.

10. A process for the treatment of conditions associated with excess fluid retention and excess electrolyte retention which comprises administering 6-chloro-7-sulfamyl-3,4-dihydro-2H-1,2-benzothiazine - 1,1 - dioxide, said compound being administered in sufficient quantity to enhance the excretion of said fluid and electrolytes.

References Cited in the file of this patent

Richter: Organic Chemistry, vol. 4, page 5 (1949).